United States Patent
Ono

(10) Patent No.: US 6,329,786 B1
(45) Date of Patent: Dec. 11, 2001

(54) ENTERTAINMENT SYSTEM, CELL CHARGING SYSTEM, ENTERTAINMENT APPARATUS, PORTABLE INFORMATION TERMINAL, AND EXTERNAL CELL CHARGER

(75) Inventor: Akihisa Ono, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/572,812

(22) Filed: May 17, 2000

(30) Foreign Application Priority Data

May 21, 1999 (JP) .................................................. 11-141915

(51) Int. Cl.[7] ...................................................... H02J 7/00
(52) U.S. Cl. ............................................ 320/113; 307/66
(58) Field of Search .............................. 320/113; 307/48, 307/64, 66

(56) References Cited

U.S. PATENT DOCUMENTS

| | | | |
|---|---|---|---|
| 5,650,669 | 7/1997 | Aldous | .................................... 307/66 |
| 5,825,099 | * 10/1998 | Kwon | ...................................... 307/48 |
| 5,896,125 | * 4/1999 | Niedzwiecki | ......................... 345/168 |
| 6,011,323 | * 1/2000 | Camp | ...................................... 307/64 |
| 6,134,590 | * 10/2000 | Perlman | ............................... 709/228 |
| 6,139,433 | * 10/2000 | Miyamoto et al. | ................... 345/474 |
| 6,141,730 | * 10/2000 | Nishiumi et al. | ..................... 711/115 |

OTHER PUBLICATIONS

C. Johnston et al: "More Details on Sony PDA", Gamespot News.

* cited by examiner

Primary Examiner—Peter S. Wong
Assistant Examiner—Pia Tibbits
(74) Attorney, Agent, or Firm—Helfgott & Karas, PC

(57) ABSTRACT

An entertainment apparatus for reading a program stored in an optical disk or the like as a detachably storage medium and executing a game based on the read program, charges a secondary cell accommodated in a portable information terminal. When the portable information terminal is connected to the entertainment apparatus, a charging circuit in the portable information terminal introduces a DC power supply from a charging power supply output terminal of the entertainment apparatus via a charging input terminal, increase the voltage of the DC power supply, and then charges the secondary cell in the portable information terminal with the DC power supply.

13 Claims, 17 Drawing Sheets

ENTERTAINMENT SYSTEM, CELL CHARGING SYSTEM, ENTERTAINMENT APPARATUS, PORTABLE INFORMATION TERMINAL, AND EXTERNAL CELL CHARGER

BACKGROUND OF THE INVENTION

1. Field of the Invention

The present invention relates to an entertainment system comprising a portable information terminal and an entertainment apparatus to which the portable information terminal is detachably connectable, a cell charging system comprising a portable information terminal and a portable information terminal host, an entertainment apparatus to which a portable information terminal is detachably connectable, a portable information terminal detachably connectable to an entertainment apparatus, and an external cell charger for charging a cell of a portable information terminal.

2. Description of the Related Art

Recently, portable information terminals, also known as PDA (Personal Digital Assistant), which have a flat display panel such as a liquid crystal display panel, such as portable computers, electronic notepads, portable telephone sets, PHS (Personal Handy-phone System) terminals, pagers, or the like have widely been used in the art.

Such a portable information terminal may be connected to a notebook-type personal computer or a stationary computer for data transfer to and from the computer.

Entertainment apparatus for downloading a program from a mass storage medium such as a CD-ROM as an optical disk and executing a game according to the downloaded program, or playing back music based on data from a CD have also been in widespread use.

There have commercially been available portable information terminals that can detachably be connected to such entertainment apparatus for downloading a program via the entertainment apparatus and executing a game according to the downloaded program by themselves.

Batteries incorporated in portable information terminals for energizing them are generally primary batteries because the primary batteries have a cell capacity several times greater than chargeable secondary batteries of the same volume and hence allow the portable information terminals to operate for a longer period of time.

If a secondary cell is incorporated in a portable information terminal, then the secondary cell is charged by an external cell charger which is supplied with an AC power supply and dedicated for charging the secondary cell.

The portable information terminals powered by primary batteries are disadvantageous that the primary cell needs to be replaced with a new one each time it is used up.

Use of the external cell charger dedicated for charging the secondary cell with the AC power supply is costly because the external cell charger needs to have dedicated circuits including an AC-to-DC converter.

SUMMARY OF THE INVENTION

It is therefore an object of the present invention to provide an entertainment system and a cell charging system which are capable of charging the cell of a portable information terminal even without an external cell charger.

Another object of the present invention is to provide an entertainment system and a cell charging system which are capable of charging the cell of a portable information terminal even without an external cell charger and allow a portable information terminal to be charged by an external cell charger.

Still another object of the present invention is to provide an entertainment system which is capable of charging the cell of a portable information terminal having a particular structure.

Yet another object of the present invention is to provide a portable information terminal having a secondary cell disposed therein which can be charged appropriately.

Yet still another object of the present invention is to provide an external cell charger which can be used with AC and DC power supplies and has characteristic functions.

A further object of the present invention is to provide an external cell charger which is supplied with an alternating current or a direct current and is capable of charging the secondary cell of a portable information terminal.

An entertainment system according to the present invention is arranged such that when a portable information terminal accommodating a secondary cell therein is connected to an entertainment apparatus, the secondary cell can be charged by a power supply supplied from a charging power supply output terminal of the entertainment apparatus via a charging input terminal and a charging circuit of the portable information terminal. The secondary cell in the portable information terminal can thus be charged without the need for an external cell charger.

The entertainment system also has an external cell charger having a second charging circuit for being supplied with an AC power supply and a DC power supply. The portable information terminal is detachably connectable to the external cell charger. The portable information terminal has a second charging input terminal for charging the secondary cell in bypassing relationship to the first charging circuit. When the portable information terminal is connected to the external cell charger, the secondary cell can be charged by a power supply supplied from the second charging circuit via the second charging input terminal. Therefore, the secondary cell in the portable information terminal can also be charged by the external cell charger.

The second charging circuit may be used with the AC power supply exclusively or the DC power supply exclusively.

A cell charging system according to the present invention is arranged such that when a portable information terminal accommodating a secondary cell therein is connected to a portable information terminal host, the secondary cell can be charged by a power supply supplied from a charging power supply output terminal of the portable information terminal host via a charging input terminal and a charging circuit of the portable information terminal. The secondary cell in the portable information terminal can thus be charged without the need for an external cell charger.

The cell charging system has an external cell charger having a second charging circuit for being supplied with an AC power supply and/or a DC power supply. The portable information terminal is detachably connectable to the external cell charger. The portable information terminal having a second charging input terminal for charging the secondary cell in bypassing relationship to the first charging circuit. When the portable information terminal is connected to the external cell charger, the secondary cell can be charged by a power supply supplied from the second charging circuit via the second charging input terminal. Therefore, the secondary cell in the portable information terminal can also be charged by the external cell charger.

An entertainment apparatus according to the present invention can supply a power supply to a portable information terminal having a charging circuit.

A portable information terminal according to the present invention has an internal charging circuit for charging a secondary cell with a first DC power supply supplied via a first charging input terminal, and a second charging input terminal for charging the secondary cell in bypassing relationship to the internal charging circuit, with a second DC power supply having a voltage higher than the first DC power supply. The secondary cell can be charged depending on a DC voltage that can be supplied.

A cell charger according to the present invention has connections for a primary cell which can be housed therein, connections for an external AC power supply, and a charging circuit connected to the connections, for selecting the primary cell or the external AC power supply and outputting a charging output. The charging circuit has means for generating the charging output using only the AC power supply when the external AC power supply is detected as being connected while the primary cell is being housed. When the AC power supply is connected, the secondary cell is charged by the AC power supply with priority, the primary cell can effectively be used.

The cell charger is arranged to charge a secondary cell with the charging output, the secondary cell being accommodated in a portable information terminal for executing a program supplied from an external source.

An AC-input cell charger according to the present invention has an AC-input charging circuit for being supplied with an AC power supply and outputting a DC power supply to charge a secondary cell accommodated in a portable information terminal having an internal charging circuit. When the portable information terminal is connected to the AC-input cell charger, the secondary cell can be charged by the DC power supply supplied from the AC-input charging circuit in bypassing relationship to the internal charging circuit of the portable information terminal.

To charge the secondary cell in bypassing relationship to the internal charging circuit, a charging power supply output terminal of the AC-input charging circuit may be of such a length as to be electrically connected to only the second charging input terminal when the portable information terminal is connected to the AC-input cell charger.

A DC-input cell charger according to the present invention has having a DC-input charging circuit for being supplied with a DC power supply from a primary cell housed therein and outputting a DC power supply to charge a secondary cell accommodated in a portable information terminal having an internal charging circuit. When the portable information terminal is connected to the DC-input cell charger, the secondary cell can be charged by the DC power supply supplied from the DC-input charging circuit in bypassing relationship to the internal charging circuit of the portable information terminal.

To charge the secondary cell in bypassing relationship to the internal charging circuit, a charging power supply output terminal of the DC-input charging circuit may be of such a length as to be electrically connected to only the second charging input terminal when the portable information terminal is connected to the DC-input cell charger.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
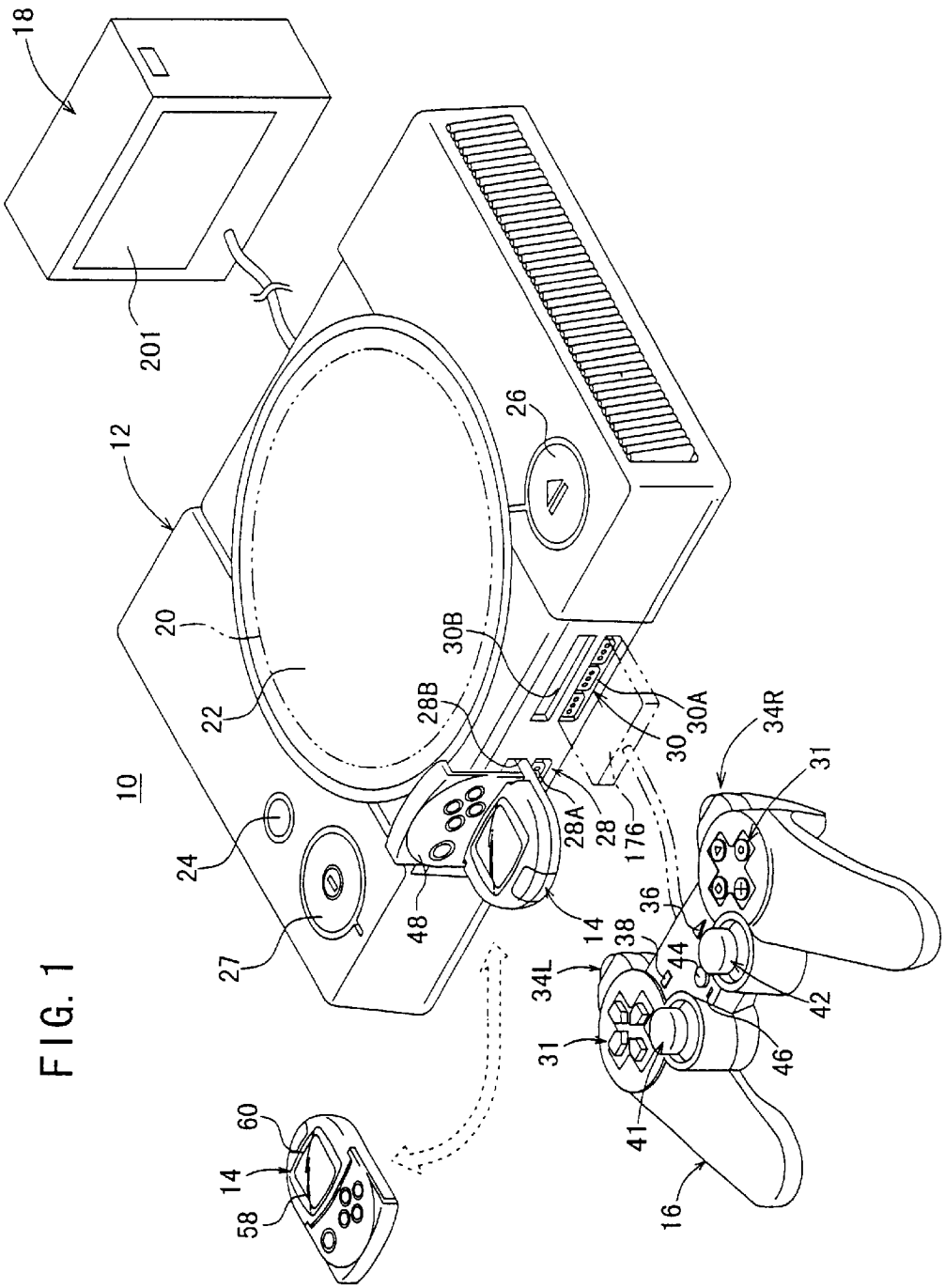
FIG. 1 is a perspective view of an entertainment system according to the present invention.
Figure 2:
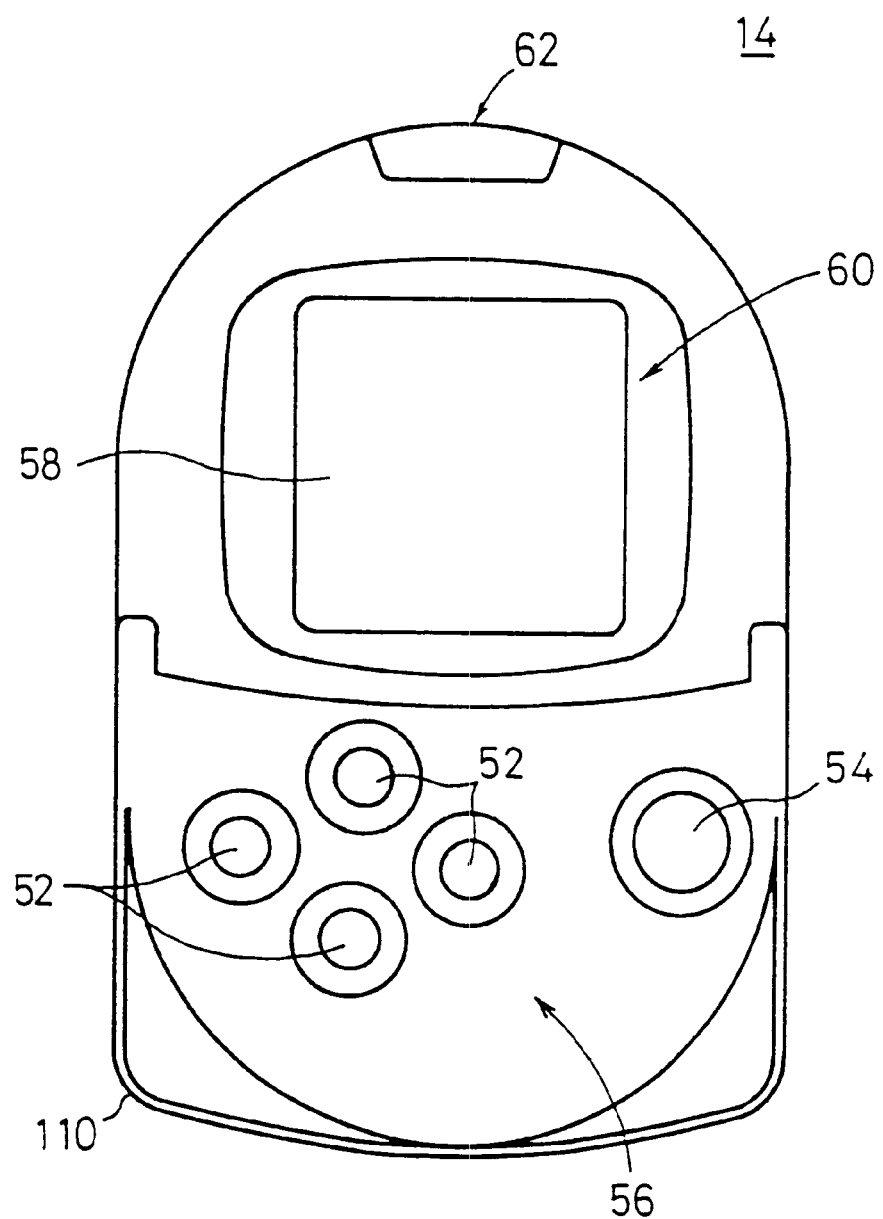
FIG. 2 is a plan view of a portable information terminal.

FIG. 1 shows in perspective an entertainment system 10 according to the present invention. As shown in FIG. 1, the entertainment system 10 includes an entertainment apparatus 12 which serves as a portable information terminal host, a portable information terminal 14 detachably connected to the entertainment apparatus 12 and powered by a built-in secondary cell, a manual controller 16 detachably connected to the entertainment apparatus 12, and a display monitor 18 such as a television receiver which is supplied with video and audio output signals from the entertainment apparatus 12.

The entertainment apparatus 12 can read a program recorded in a mass storage medium such as an optical disk 20 such as a CD-ROM, for example, and execute a game, for example, based on the program depending on commands supplied from the user, e.g., the game player. The execution of the game mainly represents controlling the progress of the game by controlling the display of images and the generation of sounds on the display monitor 18 in response to input signals from the manual controller 16.

The entertainment apparatus 12 is essentially in the shape of a flat rectangular parallelepiped, and has a disk loading unit 22 disposed centrally therein for loading an optical disk 20 storing an application program and data of a video game or the like, a reset switch 24 for resetting a program which is being executed at present, a disk control switch 26 for controlling the loading of the optical disk 20, a power supply switch 27, and two slot 28, 30, for example.

The entertainment apparatus 12 may be supplied with the application program via a communication link, rather than being supplied from the optical disk 20 as the recording medium.

The slots 28, 30 have respective upper slot units 28B, 30B and respective lower slot units 28A, 30A. Manual controllers 16 can be connected respectively to the lower slot units 28A, 30A. Memory cards (not sown) or portable information terminals 14 which also function as memory cards can be connected to respectively to the upper slot units 28B, 30B. The slots 28 (28A, 28B) and the slots 30 (30A, 30B) are of asymmetrical shapes to avoid erroneous insertion of manual controllers and memory cards or portable information terminals.

The manual controller 16 has first and second control pads 31, 32, an L (Left) button 34L, an R (Right) button 34R, a start button 36, and a selection button 38. The manual controller 16 also has first and second swivel control members 41, 42 for making analog control actions, a mode selection switch 44 for selecting control modes of the swivel control members 41, 42, and an indicator 46 for indicating a selected control mode.

As shown in FIG. 1, the portable information terminal 14 with a lid 48 being open is connected to the entertainment apparatus 12. A program and data are downloaded from the entertainment apparatus 12 into the portable information terminal 14 which is connected to the entertainment apparatus 12. In this sense, the entertainment apparatus 12 is considered to be a downloading apparatus.

When the portable information terminal 14 is disconnected from the entertainment apparatus 12, stated otherwise, when the portable information terminal 14 is a stand-alone system, the portable information terminal 14 can be operated on a build-in secondary cell to execute a program downloaded from the entertainment apparatus 12.

As shown in FIGS. 2 through 5, the portable information terminal 14 has a housing 50 (see FIGS. 3 through 5) 50 which supports a manual control pad 56 having one or more direction buttons 52 and a decision button 54 for entering events and making various selections, a color display unit 60 comprising a TFT (Thin-Film Transistor) liquid crystal display (LCD) unit or the like, and a window 62 for wireless communication via infrared radiation or the like. The color display unit 60 has a color display screen 58.

Figure 3:
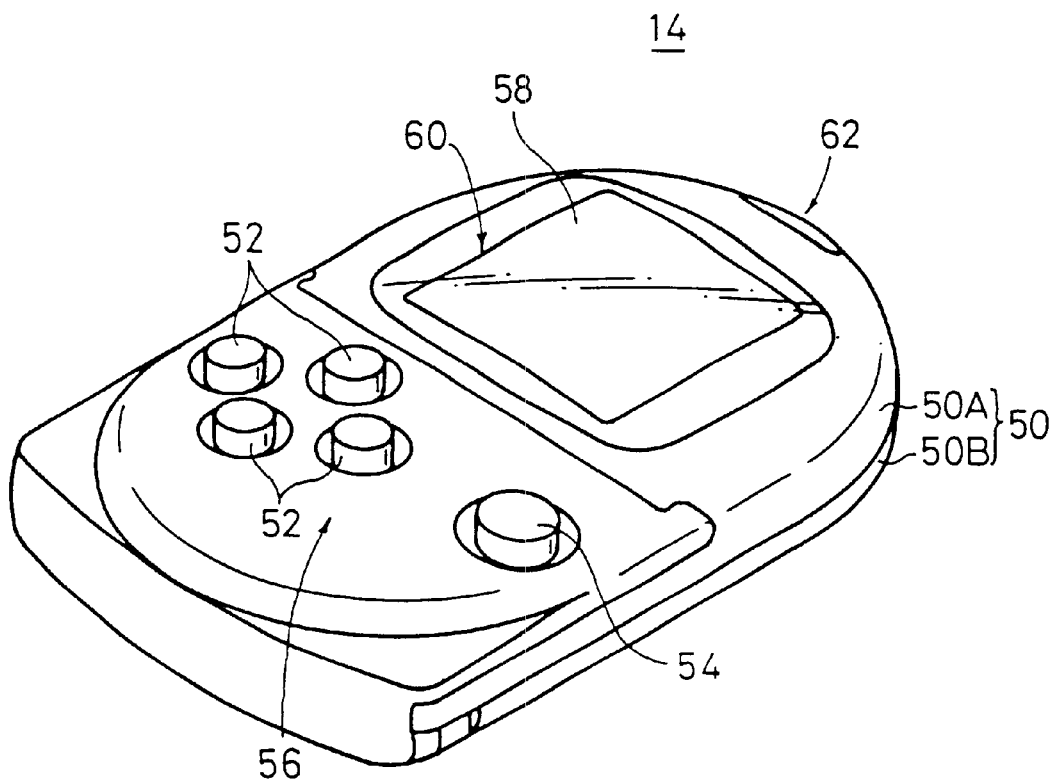
FIG. 3 is a perspective view of the portable information terminal.
Figure 4:
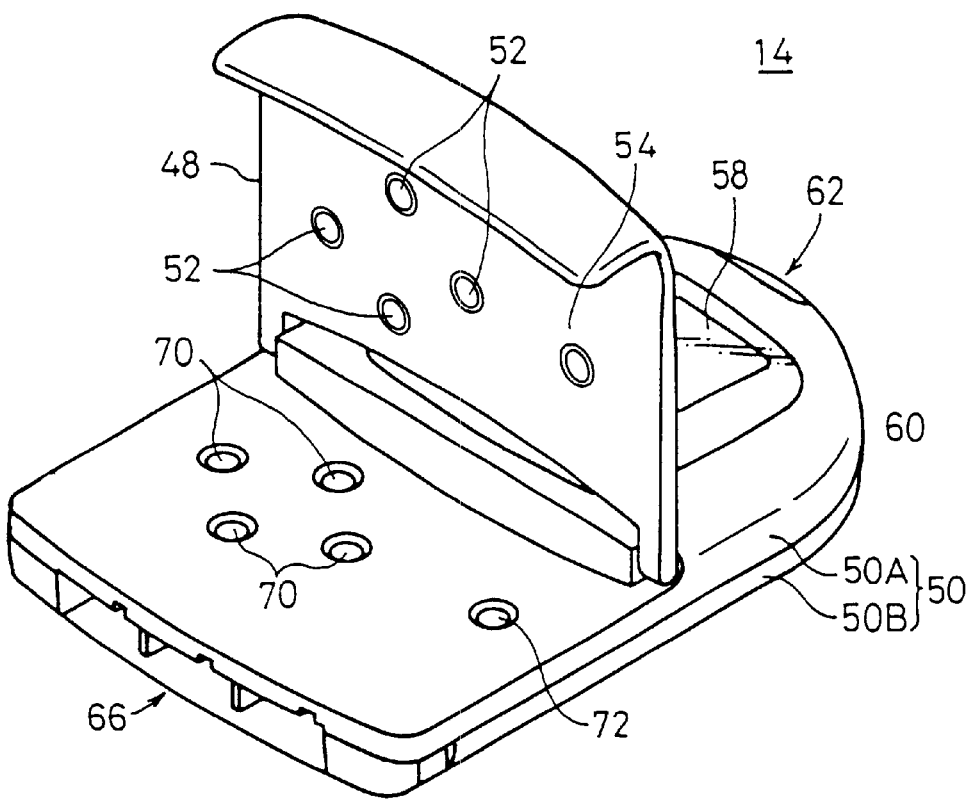
FIG. 4 is a perspective view of the portable information terminal with a lid being open.
Figure 5:
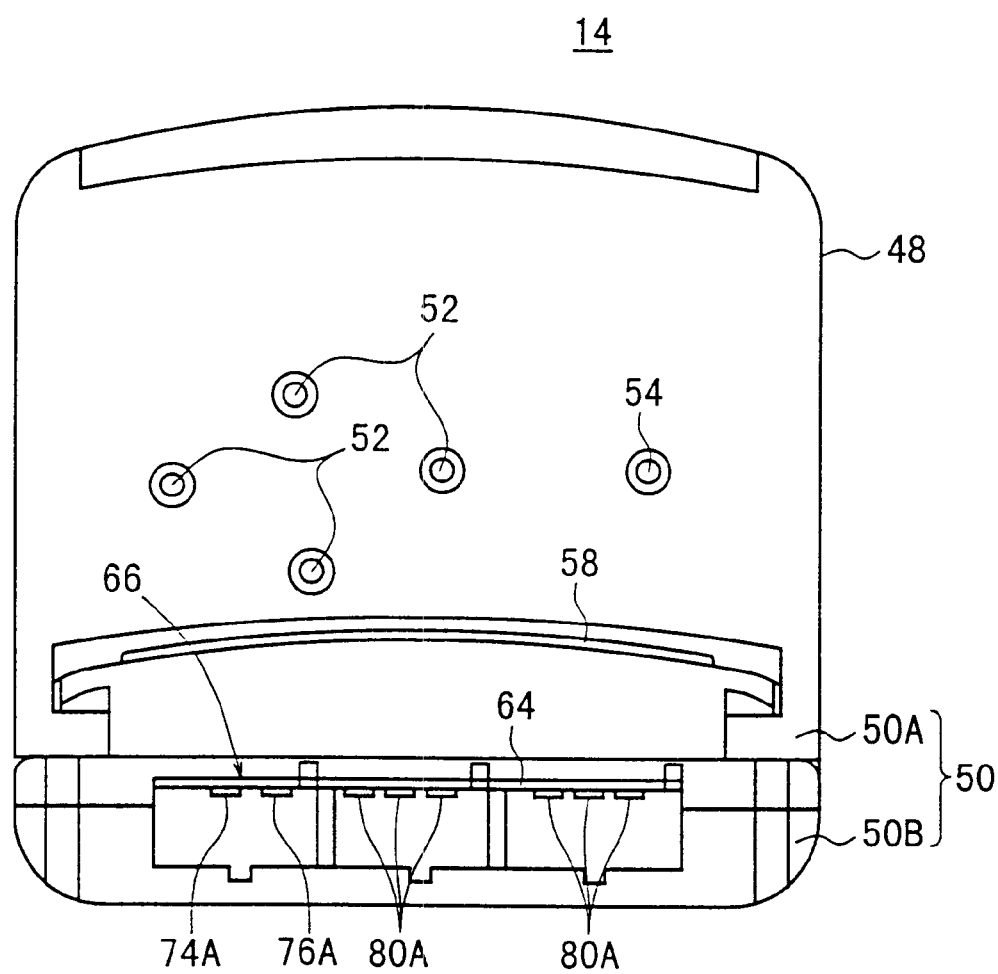
FIG. 5 is a front elevational view of the portable information terminal with the lid open.

As shown in FIG. 3, the housing 50 comprises an upper shell 50A and a lower shell 50B. The housing 50 houses a wiring board 64 which supports a memory device, etc. thereon, as shown in FIG. 5. The housing 50 has a connector assembly 66 (see FIGS. 4 and 5) disposed in an end thereof and having a elongate rectangular window.

The manual control pad 56 comprises a lid 48 that is supported on the housing 50 for angular movement through about 90 degrees and switch pressers 70, 72 positioned in an area of the housing 50 which can be opened and closed by the lid 48.

The direction buttons 52 and the decision button 54 extend through the lid 48. The direction buttons 52 and the decision button 54 are supported on the lid 48 for movement into and out of the upper surface of the lid 48.

The switch pressers 70, 72 have respective pressing elements supported on the housing 50 for movement into and out of the upper surface of the housing 50. When one of the pressing elements is pressed from above, it presses a corresponding pressure switch such as a diaphragm switch, for example, mounted on the wiring board 64 in the housing 50.

With the lid 48 closed, when the direction buttons 52 and the decision button 54 are pressed from above into the upper surface of the lid 48, the direction buttons 52 and the decision button 54 cause the pressing elements of the corresponding switch pressers 70, 72 to press corresponding pressure switches in the housing 50.

As shown in FIG. 5, a power supply terminal 74A (also referred to as "first charging input terminal") and a ground terminal 76A which serve as charging input terminals for charging a secondary cell, and a plurality of signal terminals 80A are mounted on the wiring board 64 and disposed in the window of the connector assembly 66. These terminals function as connectors. Terminals for connection as connectors to the terminals 74A, 76A, 80A are disposed in the upper slot units 28B, 30B of the entertainment apparatus 12.

An electric circuit arrangement of the entertainment system 10 shown in FIG. 1 which includes a circuit arrangement of the entertainment apparatus 12 will be described below with reference to FIG. 6.

Figure 6:
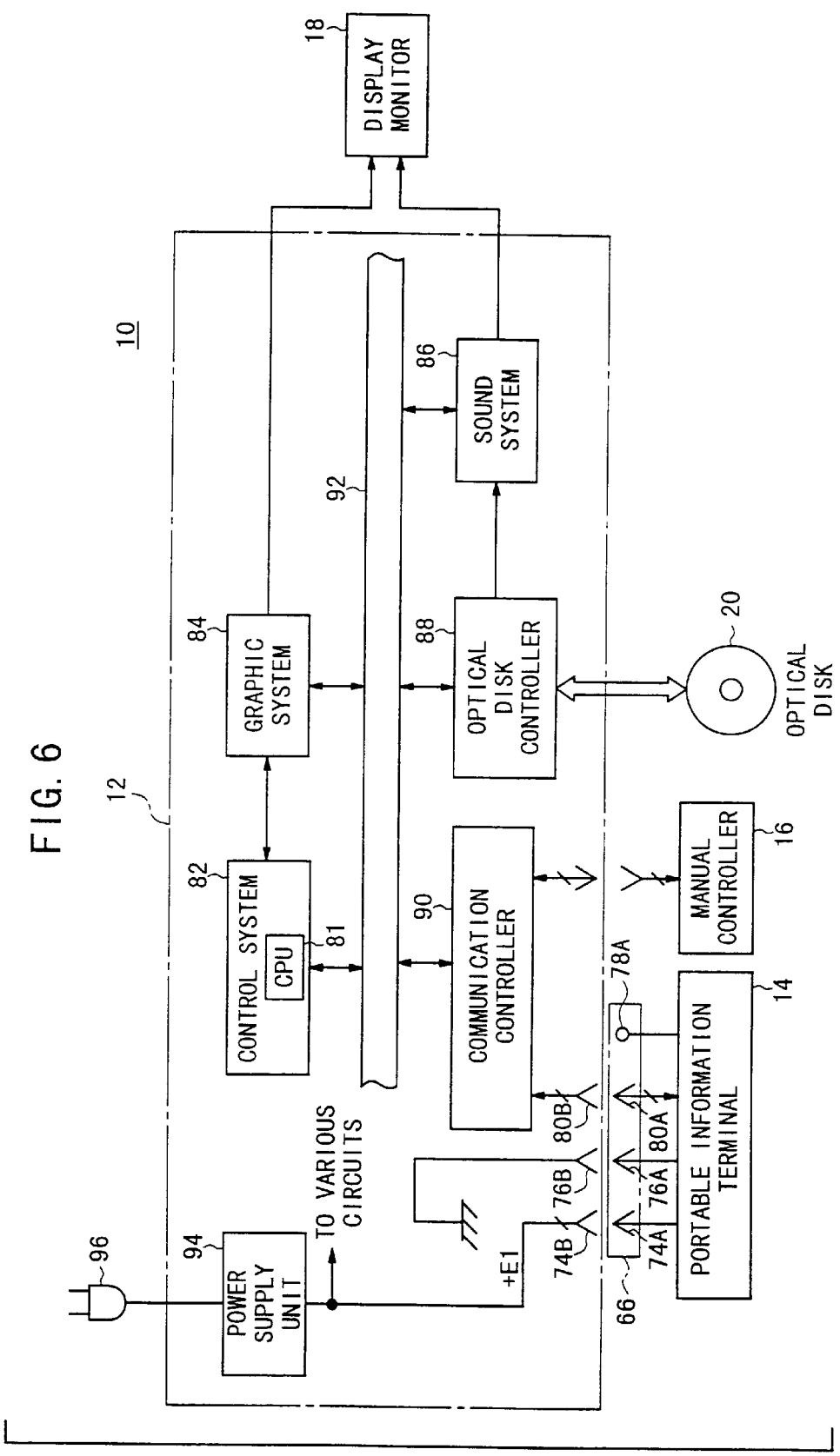
FIG. 6 is a block diagram of an electric arrangement of an entertainment apparatus.

As shown in FIG. 6, the entertainment apparatus 12 comprises a control system 82 including a central processing unit (CPU) 81 and peripheral devices thereof, a graphic system 84 including a frame buffer and a graphic processing unit (GPU) for rendering image data in the frame buffer, a sound system 86 including a sound processing unit (SPU) for generating music sounds and sound effects, an optical disk controller 88 for controlling the readout of the optical disk 20 in which application programs and data are stored, a communication controller 90 for controlling the inputting of data into and outputting of data from the manual controller 16, the portable information terminal 14, or the memory card (not shown), and a system bus 92 to which the control system 82, the graphic system 84, the sound system 86, the optical disk controller 88, and the communication controller 90 are connected.

Video and audio signals generated by and outputted from the graphic system 84 and the sound system 86 are supplied to the display monitor 18 to display images on the display screen of the display monitor 18 and reproduce sounds from the speakers of the display monitor 18.

The entertainment apparatus 12 also has a power supply unit 94 for converting an AC power supply input such as under AC 100 V supplied via an AC plug 96 into a DC power supply (first DC power supply) +E1 (=about +3.5 V for directly energizing semiconductors in various circuits), and supplying the DC power supply +E1 to various circuits, and also supplying the DC power supply +E1 to a power supply output terminal 74B which is a charging power supply output terminal in the slot units 28B, 30B (see FIG. 1).

The power supply output terminal 74B, a ground terminal 76B, and a plurality of signal terminals 80B of the entertainment apparatus 12 serve as connectors, and are electrically connected to the power supply terminal 74A, the ground terminal 76A, and the signal terminals 80A, respectively, of the connector assembly 66 of the portable information terminal 14.

The power supply terminal 74A of the portable information terminal 14 serves as a first charging input terminal for normally charging the secondary cell. The connector assembly 66 of the portable information terminal 14 also has a second first charging input terminal for quickly charging the secondary cell.

Figure 7:
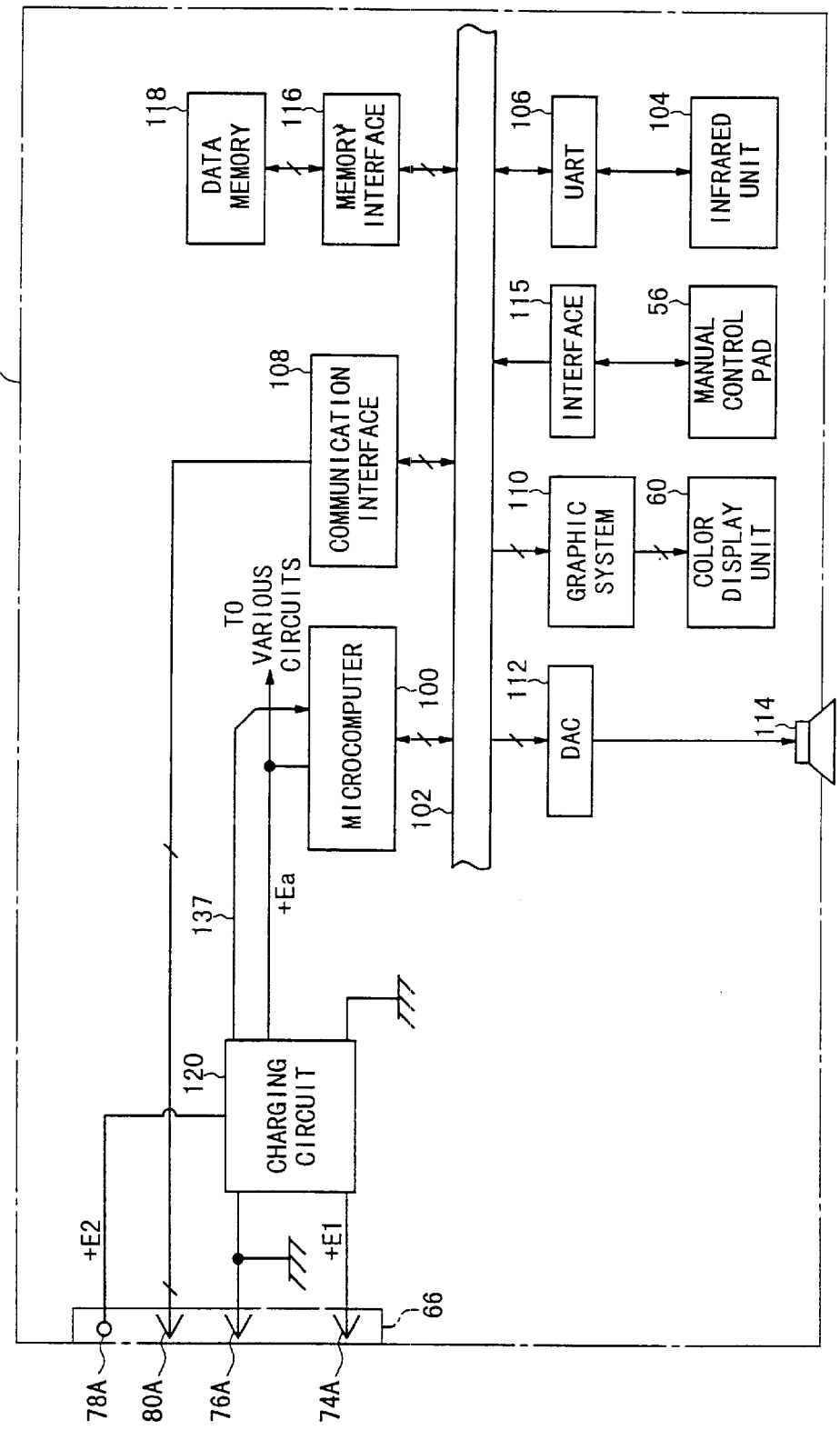
FIG. 7 is a block diagram of an electric circuit arrangement of the portable information terminal.

FIG. 7 shows an electric circuit arrangement of the portable information terminal 14 of the entertainment system 10 shown in FIG. 1. The portable information terminal 14 has a microcomputer 100 including a CPU as an entire terminal controller, a ROM (Read-Only Memory), a RAM (Random-Access Memory). The microcomputer 100 controls the entire system of the portable information terminal 14.

Various blocks of the portable information terminal 14 are connected to a system bus 102 that is managed by the microcomputer 100.

Specifically, an infrared unit 104 including an infrared radiation emitting and detecting diode for communication with other portable information terminals 14 is connected to the system bus 102 via a UART (Universal Asynchronous Receiver Transmitter) 106 which is an interface for asynchronous data transfer.

The signal terminals 80A of the connector 66 are connected to the system bus 102 via a communication interface (communication IF) 108.

To the system bus 102, there is also connected a graphic system 110 including a frame memory, a graphic display controller, and a liquid crystal display controller (not shown). Color images are displayed on the color display screen 58 of the color display unit 60 by the graphic system 110.

A DA converter 112 receives digital data from the system bus 102, converts the received digital data into analog data, and supplies the analog data to a speaker 114 which output sounds (including music sounds).

The manual controller 56 is connected to the system bus 102 via an interface (IF) 115. A data memory 118 for storing programs and data downloaded from the entertainment apparatus 12 is connected to the system bus 102 via a memory interface (memory IF) 116.

The portable information terminal 14 also has a charging circuit (also referred to as "built-in charging circuit" or "first charging circuit") 120 including a secondary cell. The built-in charging circuit 120 produces a DC power supply +Ea from the DC power supply +E1 supplied from the first charging input terminal 74A or a DC power supply (second DC power supply) +E2 supplied from a second charging input terminal 78A, and outputs the produced DC power supply +Ea.

It is assumed that the portable information terminal 14 is inserted in one of the upper slot units 28B, 30B of the entertainment apparatus 12, as shown in FIG. 1, and the AC plug 96 (see FIG. 6) of the entertainment apparatus 12 is inserted in an AC outlet (not shown) as an AC power supply outlet. When the power supply switch 27 of the entertainment apparatus 12 is turned on, the DC power supply +E1 is supplied from the power supply unit 94 via the power supply output terminal 74B and the first charging input terminal 74A of the portable information terminal 14 to a step-up circuit 126 (see FIG. 8) at an input side of the first charging circuit 120 for cell charging.

In FIG. 7, the DC power supply +Ea outputted from the built-in charging circuit 120 is supplied to the microcomputer 100 and also to various circuits in the portable information terminal 14. In this embodiment, the DC power supply +Ea has a voltage of about +3.5 V as a voltage for energizing the microcomputer 100, and is equal to the voltage of the DC power supply +E1 generated by the power supply unit 94 of the entertainment apparatus 12.

Figure 8:
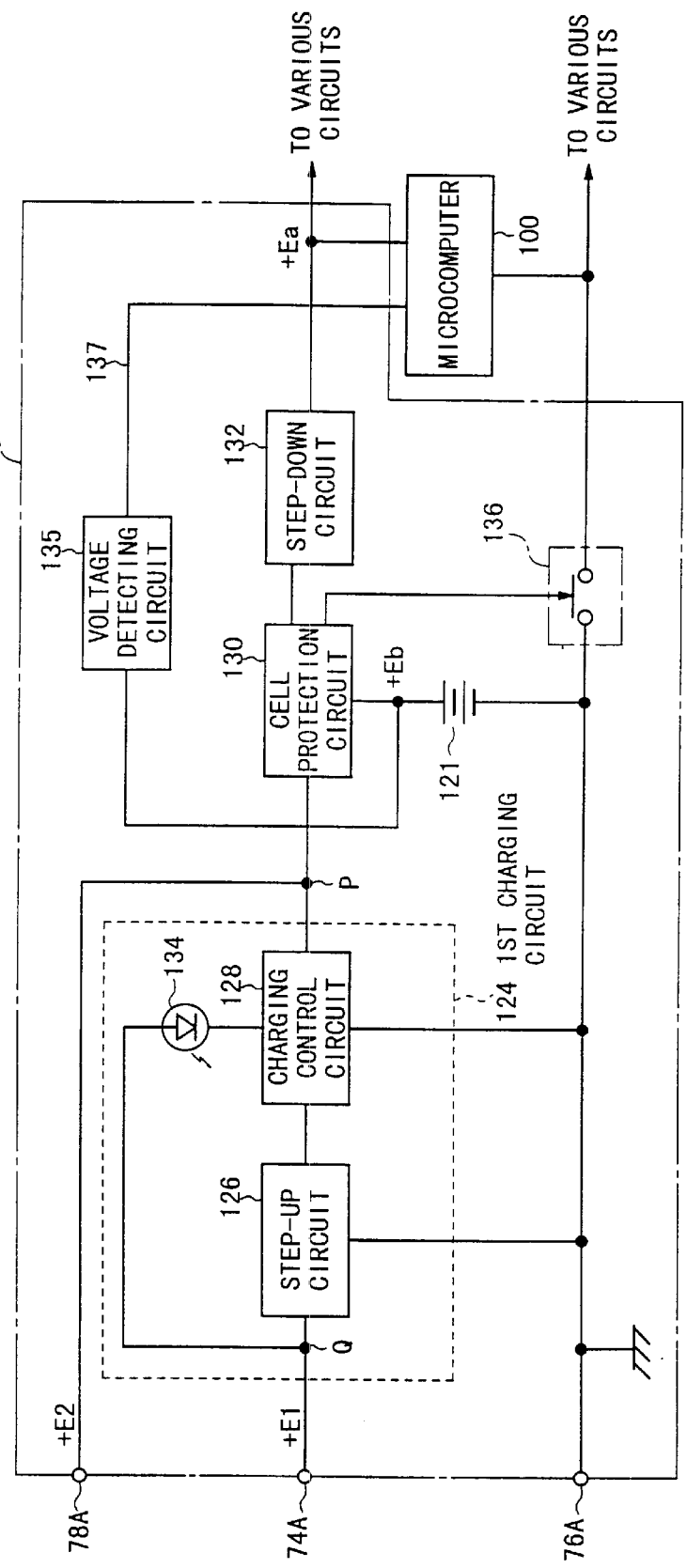
FIG. 8 is a block diagram of a detailed electric arrangement of a built-in charging circuit in the portable information terminal.

FIG. 8 shows in detail an electric arrangement of the built-in charging circuit 120 shown in FIG. 7. The built-in charging circuit 120 includes a replaceable button-shaped lithium secondary cell 121 for energizing the portable information terminal 14.

The secondary cell 121 can be charged with a power supply +Eb having a charging voltage of about +4 V. Specifically, the voltage ($\approx$+3.5 V) of the DC power supply +E1 supplied from the charging input terminal 74A is increased to the voltage of the power supply +Eb by the step-up circuit 126, which serves as a DC-to-DC converter or switching booster regulator in a first charging circuit 124 of the built-in charging circuit 120, and the voltage of the power supply +Eb is then applied via a constant-voltage, constant-current charging control circuit 128 and a cell protection circuit 130 to the secondary cell 121 to charge the secondary cell 121.

As described later on, the secondary cell 121 can also be charged with the second DC power supply +E2 supplied from an external cell charger via the second charging input terminal 78A, a node (junction) P, and the cell protection circuit 130.

The electric energy stored in the secondary cell 121 is regulated into the voltage of the power supply +Ea, which is substantially equal to +3.5 V, by the cell protection circuit 130 and a step-down circuit 132 as a series regulator, and the power supply +Ea is supplied to the microcomputer 100 and various circuits of the portable information terminal 14 (see FIG. 7).

A light-emitting diode 134 is forward-connected to the charging control circuit 128 from a node (junction) Q on a power supply line which connects the charging input terminal 74A to the step-up circuit 126. The light-emitting diode 134 functions as a charging completion indicator that is turned on when the secondary cell 121 as monitored by the charging control circuit 128 is fully charged, for thereby indicating to the user that the secondary cell 121 is fully charged.

The cell protection circuit 130 has functions to detect an excessive current supplied to the cell 121, an excessive charging of the cell 121, and an excessive discharging of the cell 121. When the cell protection circuit 130 detects either one of these excessive states, the cell protection circuit 130 opens a switch 136 to disconnect the ground terminal of the secondary cell 121 from various loads including the microcomputer 100 in order to protect the secondary cell 121. The switch 136 comprises MOS-FETs that are cascaded in opposite polarities.

The voltage of the DC power supply +Eb from the secondary cell 121 is detected via a voltage detecting circuit 135 and a signal line 137 (see also FIG. 7) by the microcomputer 100, which monitors the remaining capacity of the secondary cell 121.

If the built-in charging circuit 120 employs a secondary cell other than the lithium secondary cell, then the charging voltage of the power supply +Eb may be determined depending on the employed secondary cell. Specifically, if a secondary cell that can be charged under a voltage lower than the voltage of the power supply +E1, the step-up circuit 126 may be dispensed with. If the microcomputer 100 comprises a microcomputer that is operable in a wide operating voltage range, then the step-down circuit 132 may be unnecessary.

Each of the step-up circuit 126, the charging control circuit 128, the cell protection circuit 130, the step-down circuit 132, and the voltage detecting circuit 122 can easily be fabricated as an integrated circuit (IC). Therefore, these circuits can be manufactured inexpensively, and hence the built-in charging circuit 120 can also be manufactured inexpensively.

In this embodiment, as described above, when the portable information terminal 14 that is powered by the built-in secondary cell 121 is connected to the entertainment apparatus 12, the secondary cell 121 is charged by the power supply +E1 supplied from the power supply output terminal 74B of the entertainment apparatus 12 via the first charging input terminal 74A and the first charging circuit 124 of the portable information terminal 14. Therefore, the built-in secondary cell 121 of the portable information terminal 14 can be charged by the entertainment apparatus 12 without the need for an expensive external cell charger, which has heretofore been required.

Figure 9:
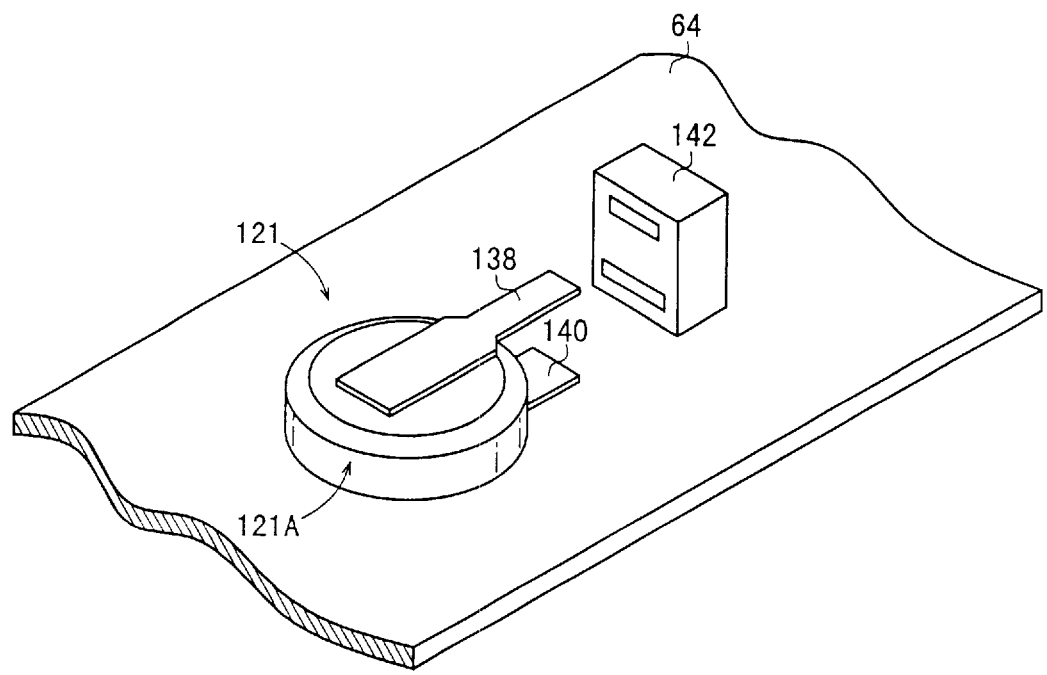
FIG. 9 is a fragmentary perspective view showing a structure in which a secondary cell is mounted on a wiring board in the portable information terminal.

As shown in FIG. 9, the secondary cell 121 has a cell body 121A to which there are attached electrode terminals 138, 140 of stainless steel having different widths, and a connector 142 with jacks having slots of different widths that correspond to the respective widths of the electrode terminals 138, 140 is mounted on the wiring board 64. The electrode terminals 138, 140 of the secondary cell 121 can thus be inserted properly into the respective slots of the jacks of the connector 142 without an error. Since the secondary cell 121 can easily be connected to and disconnected from the connector 142, the secondary cell 121 can easily be replaced with a new one when it's service life expires.

Figure 10:
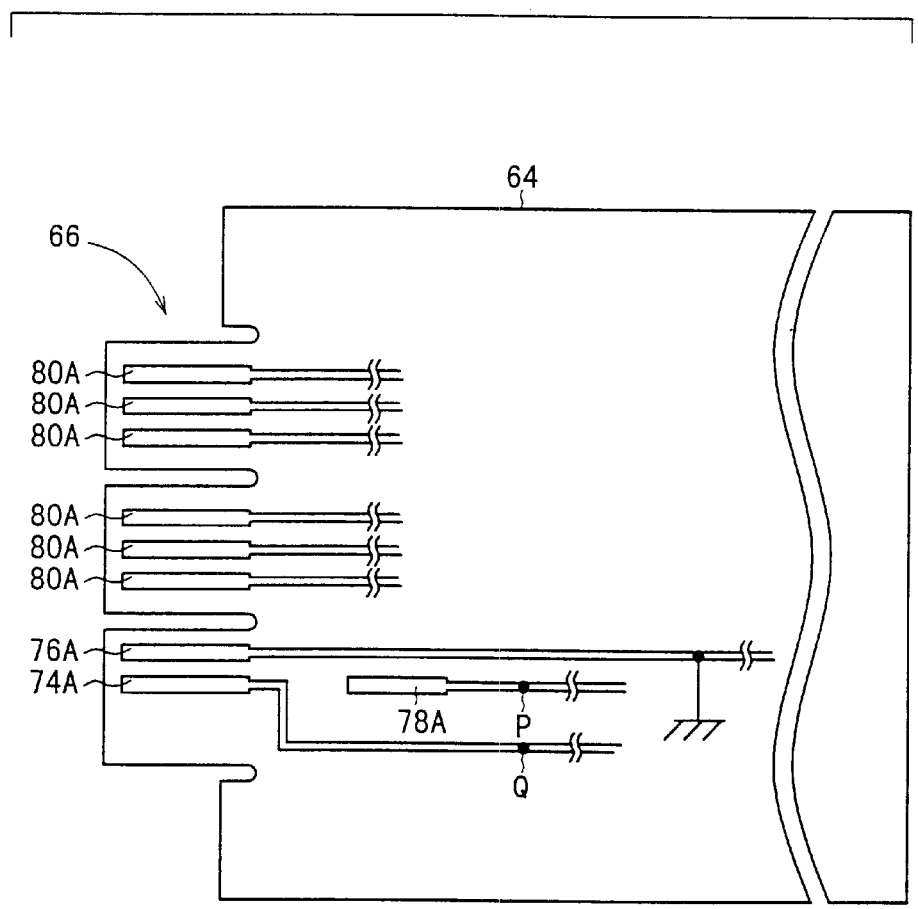
FIG. 10 is a view showing a connector assembly pattern on the wiring board in the portable information terminal of an entertainment system which can use an AC-input external cell charger.

FIG. 10 shows a pattern of the connector assembly 66 on the wiring board 64 of the portable information terminal 14 in an entertainment system which can use an AC-input external cell charger.

As shown in FIG. 10, the connector assembly 66 supports on an end thereof a wiring pattern including the ground terminal 76A, the first charging input terminal 74A as the power supply terminal, and the signal terminals 80A. The wiring pattern also includes the second charging input terminal 78A as the power supply terminal disposed inwardly of the first charging input terminal 74A (see also FIG. 8). Nodes Q, P shown in FIG. 10 are in the same circuit positions as those of the nodes Q, P shown in FIG. 8.

Figure 11:
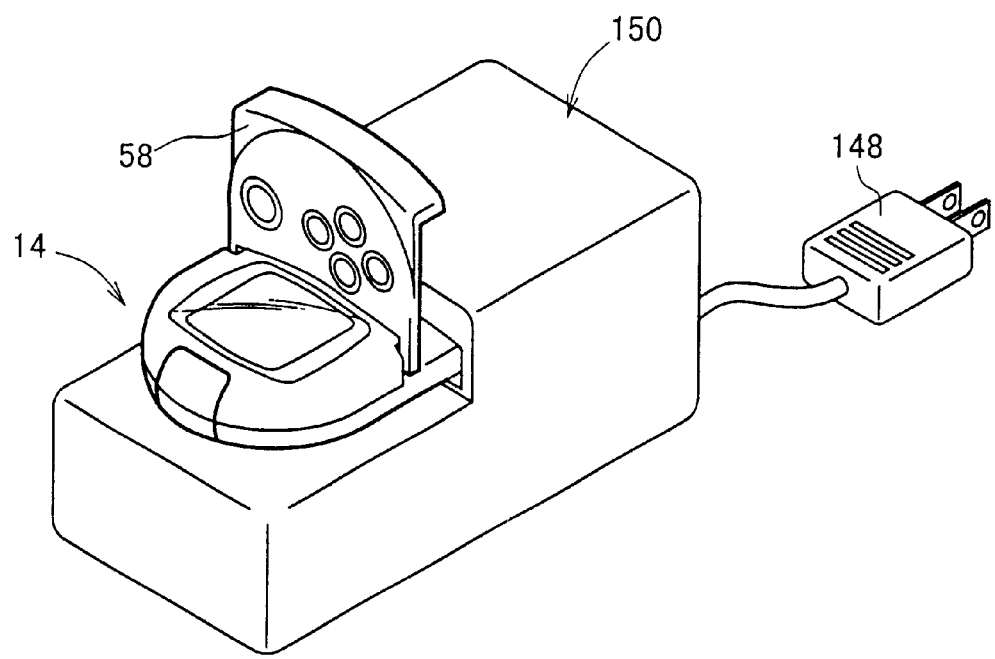
FIG. 11 is a perspective view of the AC-input external cell charger and the portable information terminal mounted thereon for charging the secondary cell in the portable information terminal.

FIG. 11 shows the portable information terminal 14 with the lid 48 being open, which is mounted on an AC-input external cell charger 150 having an AC plug 148.

Figure 12:
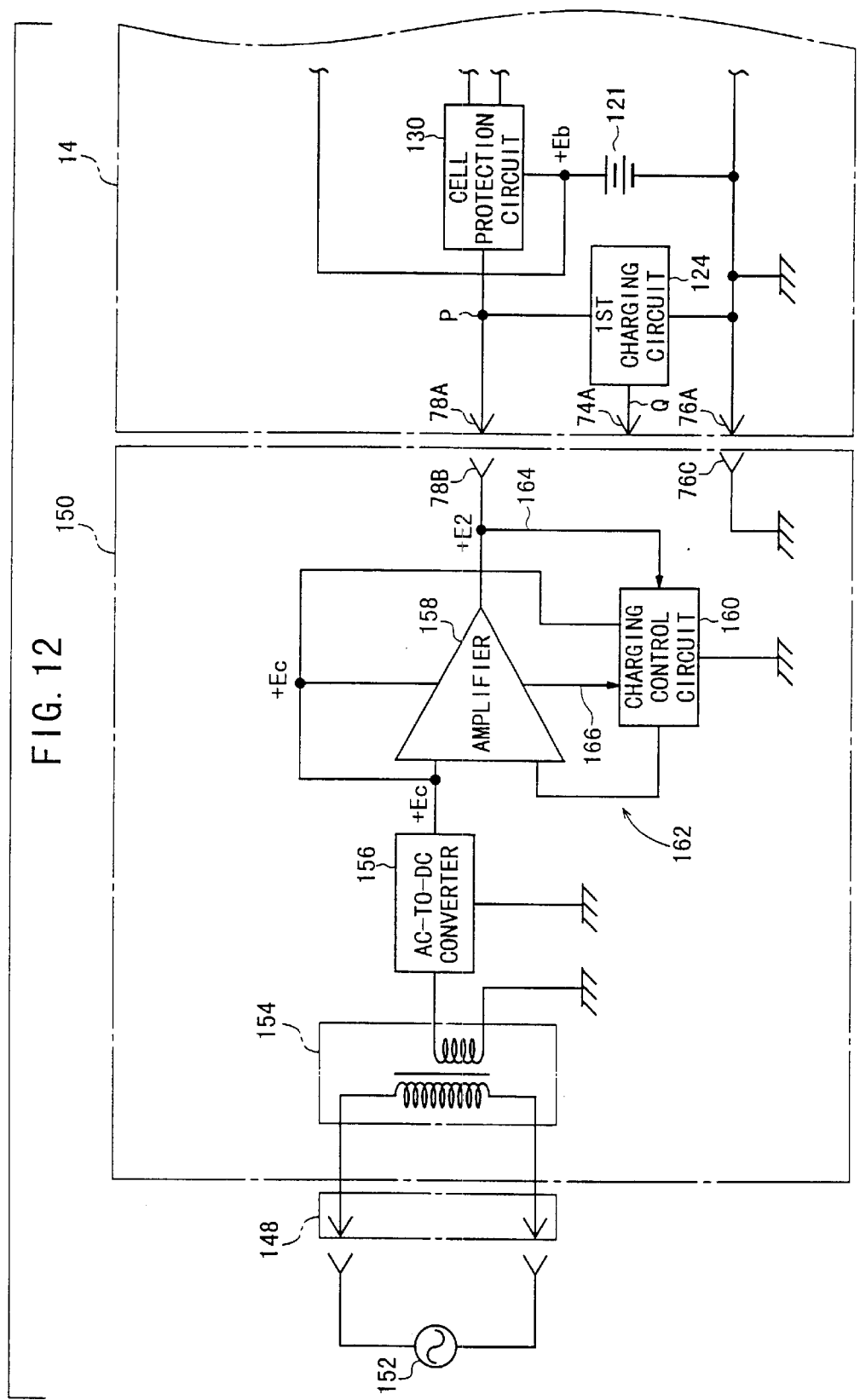
FIG. 12 is a block diagram of a block diagram of an electric circuit for charging the secondary cell in the portable information terminal with the AC-input external cell charger connected to an AC power supply.

FIG. 12 shows an electric circuit arrangement in which the AC plug 148 of the AC-input external cell charger 150 shown in FIG. 11 is connected to an AC power supply 152 for charging the secondary battery 121 of the portable information terminal 14.

As can be seen from FIGS. 11 and 12, when the portable information terminal 14 is mounted on the AC-input external cell charger 150, a charging power supply output terminal 78B of the AC-input external cell charger 150 is connected to the second charging input terminal 78A that is connected to the node P at the input side of the cell protection circuit 130 of the portable information terminal 14, and a ground terminal 76C of the AC-input external cell charger 150 is connected to the ground terminal 76A of the portable information terminal 14.

At this time, a second charging circuit 162 of the ACinput external cell charger 150 charges the secondary cell 121 via the second charging input terminal 78A and the cell protection circuit: 130, in bypassing relationship to the first charging circuit 124 (see FIG. 8) which charges the secondary cell 121 with the DC power supply +E1 from the entertainment apparatus 12.

Figure 13:
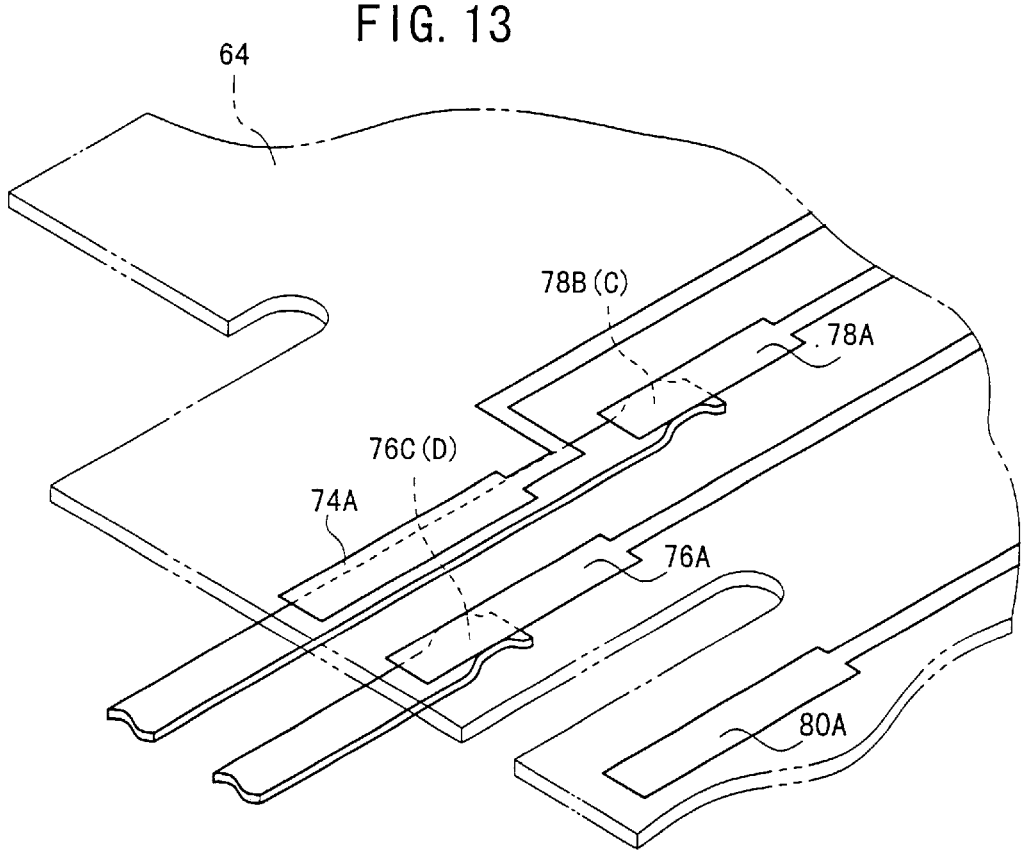
FIG. 13 is a fragmentary perspective view showing terminal connections between the AC-input external cell charger and the portable information terminal.

As shown in FIG. 13, the power supply output terminal 78B of the AC-input external cell charger 150 is longer than the ground terminal 76C for contacting the second charging input terminal 78A that is positioned inwardly of the first charging input terminal 74A on the wiring board 64 for electrical connection thereto.

The power supply output terminal 74B of the entertainment apparatus 12 is of the same short length as the ground terminal 76C shown in FIG. 13 so that when the portable information terminal 14 is connected to the entertainment apparatus 12, the power supply output terminal 74B does not contact the second charging input terminal 78A on the wiring board 64. Therefore, the power supply output terminal 74B of the entertainment apparatus 12 is of such a length as to contact the first charging input terminal 74A only.

As shown in FIG. 12, the AC-input external cell charger 150 has a transformer 154 for lowering an AC voltage ranging from 90 V to 240 V supplied from AC power supply 152, and an AC-to-DC converter 156 as a switching regulator for converting the lowered AC voltage into a DC voltage +Ec ($\approx$+4.5 V), which is applied as a power supply voltage to an amplifier 158.

The amplifier 158 and a charging control circuit 160 which provides a feedback loop across the amplifier 158 jointly make up the second charging circuit 162. A DC power supply +E2 which is outputted from the amplifier 158 (the voltage of the DC power supply +E2 is substantially the same as the voltage of the power supply +Eb for charging the secondary cell 121, and is about 4 V in this embodiment) is applied via a voltage sensing line 164 to a voltage input terminal of the charging control circuit 160, and the power supply current of the DC power supply +E2 which is outputted from the amplifier 158 is supplied via a current sensing line 166 to the charging control circuit 160.

The AC-input external cell charger 150 thus charges the secondary cell 121 under the voltage of the power supply +E2 via the cell protection circuit 130. When the AC-input external cell charger 150 is used, since limitations on the power supply capacity are less stringent than when the power supply +E1 of the entertainment apparatus 12, the second charging circuit 162 is of a quick charging circuit arrangement capable of charging the second cell 121 in a short period of time.

With the AC-input external cell charger 150 used, even if the entertainment apparatus 12 is not available, the user can charge the secondary cell 121 in the portable information terminal 14 with the AC-input external cell charger 150 by carrying the AC-input external cell charger 150 without the need for a new connector if the portable information terminal 14 has the second charging input terminal 78A to which the AC-input external cell charger 150 can be connected for charging the secondary cell 121 in bypassing relationship to the first charging circuit 124.

Figure 14:
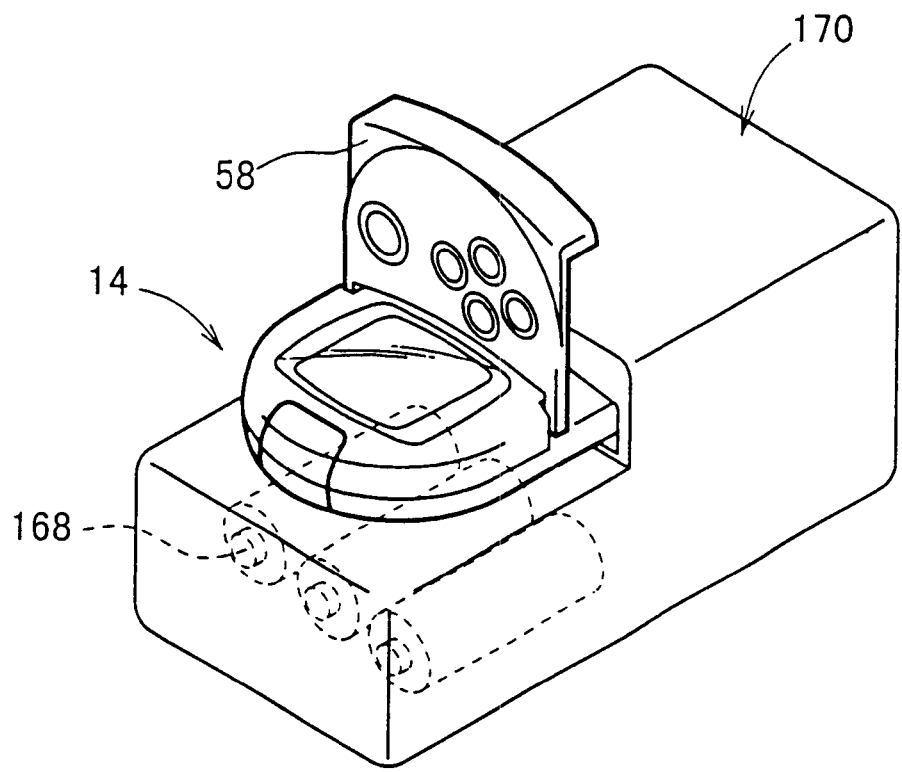
FIG. 14 is a perspective view of a DC-input external cell charger and the portable information terminal mounted thereon for charging the secondary cell in the portable information terminal.

FIG. 14 shows the portable information terminal 14 with the lid 58 being open, mounted on a DC-input external cell charger 170. The DC-input external cell charger 170 is of a structure similar to the AC-input external cell charger 150 except that three primary cells 168 are connected in series in place of the AC power supply 152 shown in FIG. 12. The primary cells 168 are housed in the DC-input external cell charger 170 and can be replaced with new ones.

Figure 15:
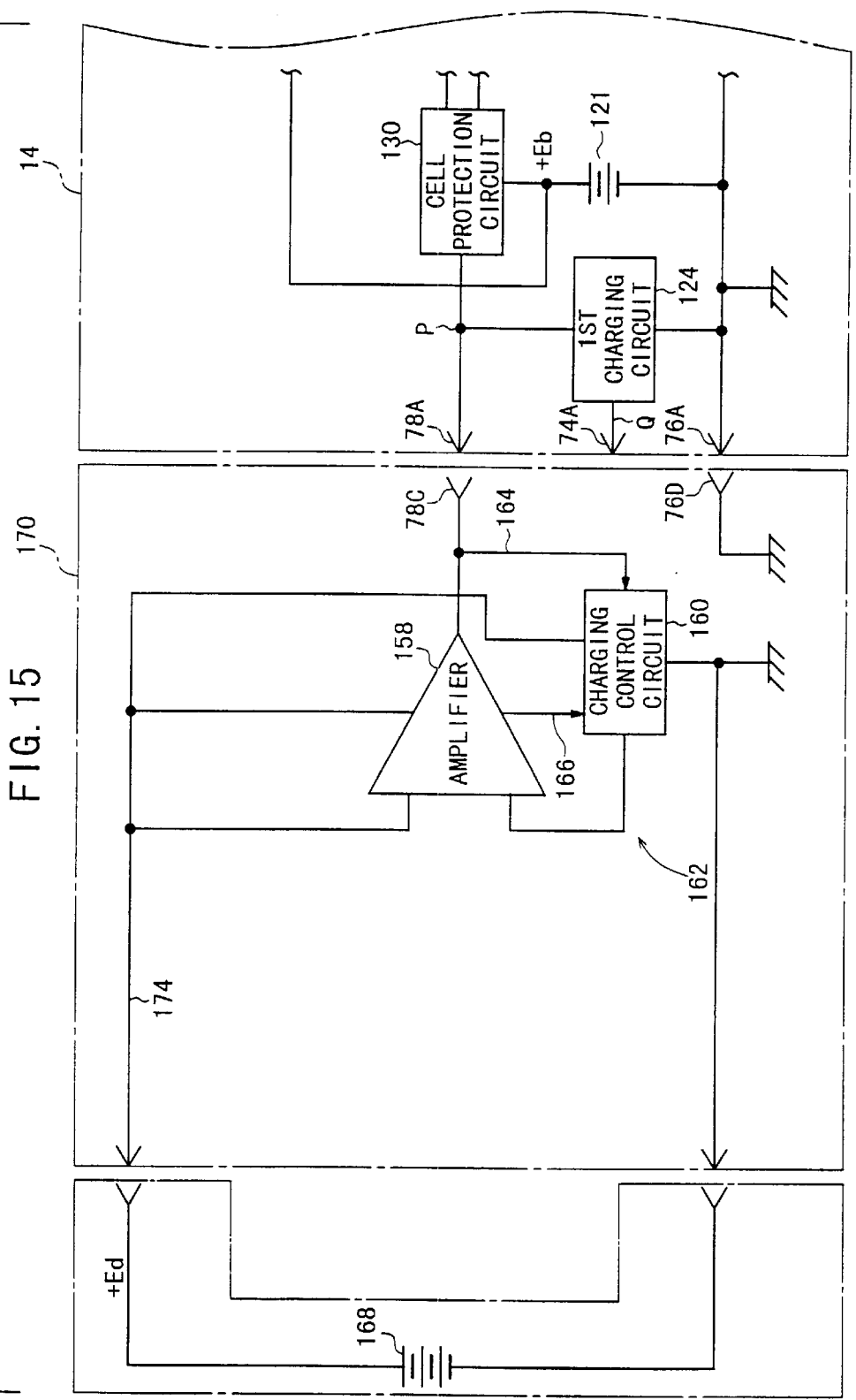
FIG. 15 is a block diagram of an electric circuit for charging the secondary cell in the portable information terminal with a DC power supply.

As shown in FIG. 15, the second charging circuit 162 in the DC-input external cell charger 170 is supplied with a power supply +Ed from the primary cells 168 rather than the power supply +Ec for the second charging circuit 162 shown in FIG. 12 (the voltage of the power supply +Ed is about +4.5 V and is the same as the output voltage +Ec of the AC-to-DC converter 156 shown in FIG. 12 (+Ed=+Ec)). Other components and connections of the DC-input external cell charger 170 are identical to those of the AC-input external cell charger 150 shown in FIG. 12, and will not be described in detail below, except that the DC-input external cell charger 170 has a charging power supply output terminal 78C and a ground terminal 76D which correspond respectively to the charging power supply output terminal 78B and the ground terminal 76C of the AC-input external cell charger 150.

The DC-input external cell charger 170 thus constructed is capable of charging the secondary cell 121 via the second charging circuit 162 and the cell protection circuit 130. The DC-input external cell charger 170 can also charge the secondary cell 121 quickly.

In the embodiments shown in FIGS. 11 and 14, the lid 48 of the portable information terminal 14 is left open while the portable information terminal 14 is being charged. If the portable information terminal 14 has no lid 48, then the portable information terminal 14 can be operated even while it is being charged by the AC-input external cell charger 150 or the DC-input external cell charger 170. When the portable information terminal 14 is operated by the DC-input external cell charger 170, the operating time of the portable information terminal 14 in an outdoor environment, for example, may be several times longer than when the portable information terminal 14 is operated by only the secondary cell 121 because the capacity of the secondary cell 121 is a fraction of the capacity of a primary cell of the same volume.

Figure 16:
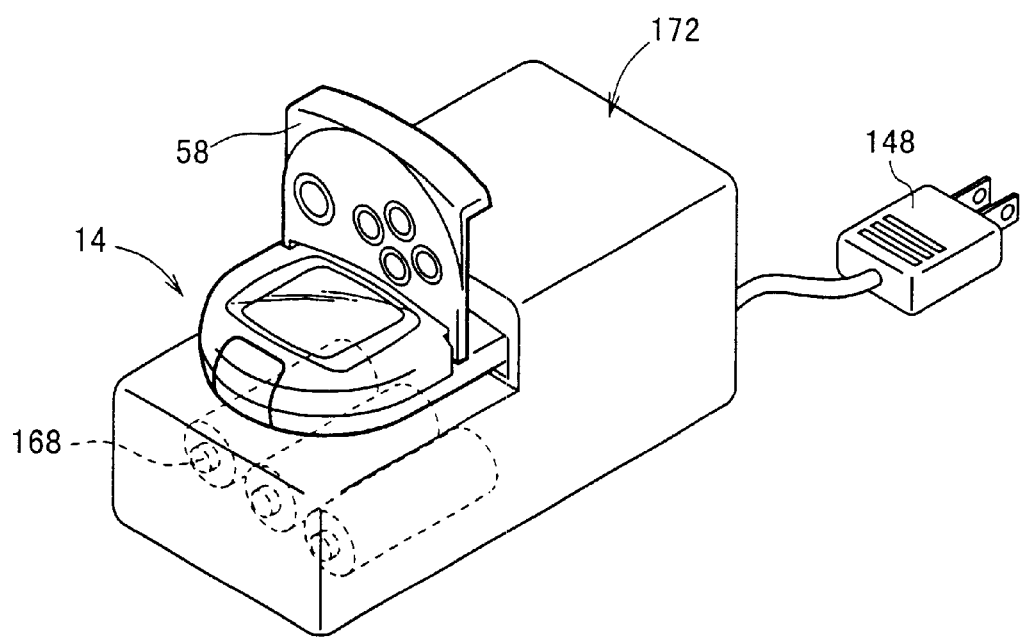
FIG. 16 is a perspective view of a DC- and/or AC-input external cell charger and the portable information terminal mounted thereon for charging the secondary cell in the portable information terminal.
Figure 17:
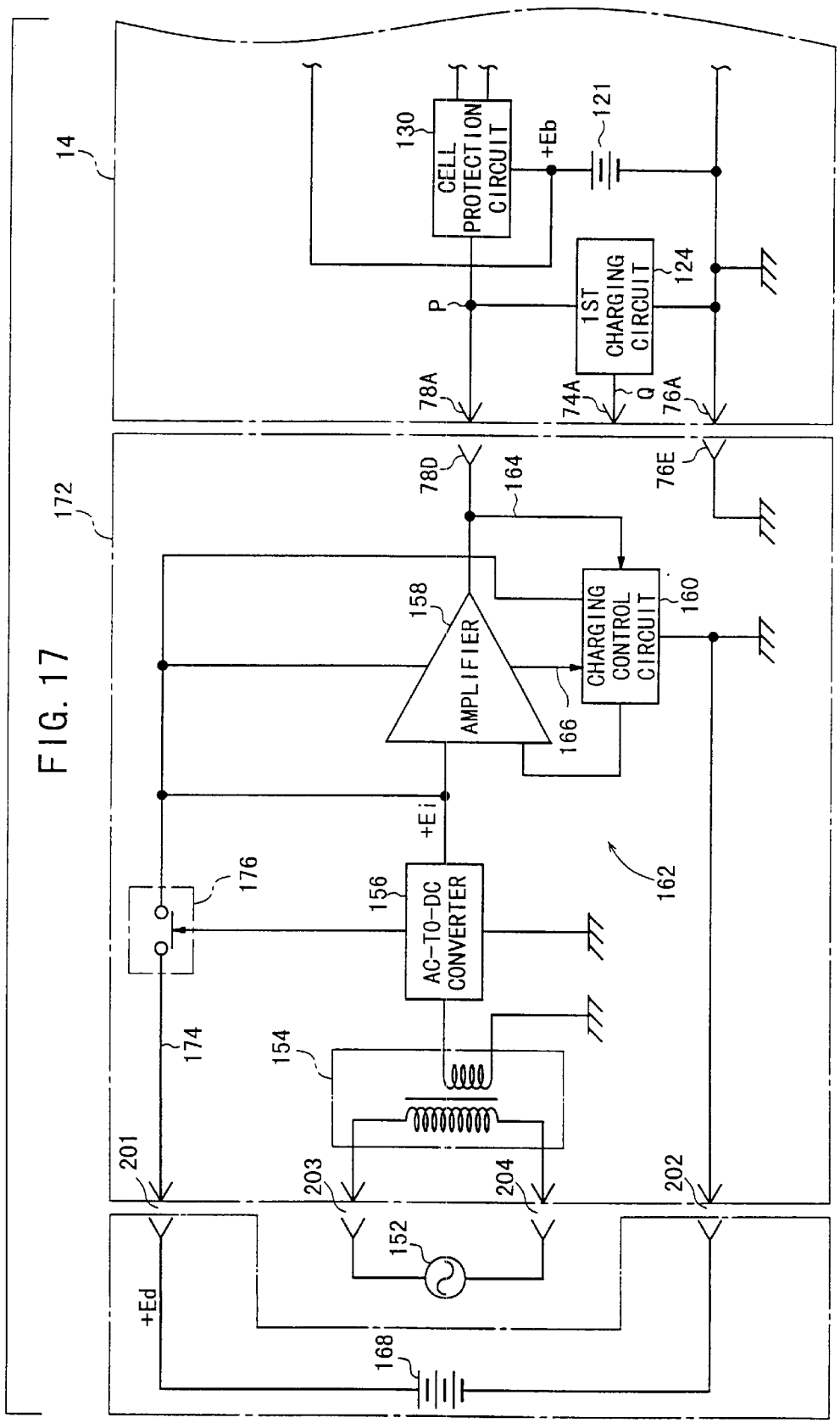
FIG. 17 is a block diagram of an electric circuit for charging the secondary cell in the portable information terminal with the DC- and/or AC-input external cell charger.

FIGS. 16 and 17 show a DC- and/or AC-input external cell charger 172 used to charge the secondary cell 121 in the portable information terminal 14.

The DC- and/or AC-input external cell charger 172 can charge the secondary cell 121 in the portable information terminal 14 with either the AC power supply 152 or the primary cells 168 as a DC input power supply via connectors 201, 202, 203, 204. As shown in FIG. 17, a switch 176 is inserted in a supply line 174 (which may be a ground line) for supplying the output power supply +Ed of the primary cells 168. When -the AC power supply 152 is connected to the DC- and/or AC-input external cell charger 172, even if the primary cells 168 are housed in the DC- and/or AC-input external cell charger 172, the switch 176 is opened by a control output signal from the AC-to-DC converter 156, allowing the AC power supply 152 to charge the secondary battery 121 with priority over the primary cells 168. Accordingly, the electric energy stored in the primary cells 168 can be saved.

Other components and connections of the DC- and/or ACinput external cell charger 172 are identical to those of the AC-input external cell charger 150 shown in FIG. 12 and the DC-input external cell charger 170 shown in FIG. 15, and will not be described in detail below, except that DC- and/or AC-input external cell charger 172 has a charging power supply output terminal 78D and a ground terminal 76E which correspond respectively to the charging power supply output terminal 78B (78C) and the ground terminal 76C (76D).

The DC- and/or AC-input external cell charger 172 is capable of charging the secondary cell 121 in the portable information terminal 14 with the either the AC power supply 152 or the primary cells (DC power supply) 168 by the second charging circuit 162 in bypassing relationship to the first charging circuit 124.

The principles of the present invention are not limited to the entertainment system 10 which comprises the portable information terminal 14 and the entertainment apparatus 12, but are also applicable to portable information terminals, which have a flat display panel such as a liquid crystal display panel, such as portable computers, electronic notepads, portable telephone sets, PHS terminals, pagers, or the like, with a built-in secondary cell, and which are connected to portable information terminal hosts such as notebooktype personal computers or fixed personal computers for use.

In such applications, a portable information terminal has a charging circuit having a charging input terminal for charging a secondary cell in the portable information terminal, and the secondary cell is charged via the charging input terminal and the charging circuit by a power supply supplied from a charging power supply output terminal of a portable information terminal host such as a notebook-type personal computer or fixed personal computer to which the portable information terminal is connected.

The above charging system comprising the portable information terminal host and the portable information terminal may employ the AC-input external cell charger 150 shown in FIG. 11, or the DC-input external cell charger 170 shown in FIG. 14, or the DC- and/or AC-input external cell charger 172 shown in FIG. 16 for charging (normally or quickly) the secondary cell in the portable information terminal.

According to the present invention, as described above, the secondary cell in the portable information terminal can be charged by the entertainment apparatus or the portable information terminal host to which the portable information terminal is connectable. The secondary cell in the portable information terminal can therefore be charged without the need for an external cell charger.

If the entertainment apparatus or the portable information terminal host is a system which converts an AC power supply into a DC power supply and operates with the DC power supply, then since the entertainment apparatus or the portable information terminal host includes an AC-to-DC converter, the cost of the portable information terminal can be reduced by the cost of the AC-to-DC converter.

The secondary cell in the portable information terminal can also be charged by the DC- and/or AC-input external cell charger, so that the portable information terminal can be used in an outdoor environment, generally in locations where no AC power supply is available.

Although certain preferred embodiments of the present invention have been shown and described in detail, it should be understood that various changes and modifications may be made therein without departing from the scope of the appended claims.

What is claimed is:

1. An entertainment system comprising:
    an entertainment apparatus for reading and executing a program stored in a detachable storage medium; and
    a portable information terminal detachably connectable to said entertainment apparatus and having a secondary cell housed therein;

said entertainment apparatus having a charging power supply output terminal;

said portable information terminal having a charging circuit having a charging input terminal for charging the secondary cell;

the arrangement being such that when said portable information terminal is connected to said entertainment apparatus, said secondary cell can be charged by a power supply supplied from said charging power supply output terminal via said charging input terminal and said charging circuit.

2. An entertainment system according to claim 1, wherein said charging circuit serves as a first charging circuit and said charging input terminal as a first charging input terminal, said entertainment system further comprising:

an external cell charger having a second charging circuit for being supplied with an AC power supply and a DC power supply;

said portable information terminal being detachably connectable to said external cell charger;

said portable information terminal having a second charging input terminal for charging the secondary cell in bypassing relationship to said first charging circuit;

the arrangement being such that when said portable information terminal is connected to said external cell charger, said secondary cell can be charged by a power supply supplied from said second charging circuit via said second charging input terminal.

3. An entertainment system according to claim 1, wherein said charging circuit serves as a first charging circuit and said charging input terminal as a first charging input terminal, said entertainment system further comprising:

an AC-input external cell charger having an AC-input charging circuit for being supplied with an AC power supply;

said portable information terminal being detachably connectable to said AC-input external cell charger;

said portable information terminal having a second charging input terminal for charging the secondary cell in bypassing relationship to said first charging circuit;

the arrangement being such that when said portable information terminal is connected to said AC-input external cell charger, said secondary cell can be charged by a power supply supplied from said AC-input charging circuit via said second charging input terminal.

4. An entertainment system according to claim 1, wherein said charging circuit serves as a first charging circuit and said charging input terminal as a first charging input terminal, said entertainment system further comprising:

a DC-input external cell charger having a DC-input charging circuit for being supplied with a DC power supply;

said portable information terminal being detachably connectable to said DC-input external cell charger;

said portable information terminal having a second charging input terminal for charging the secondary cell in bypassing relationship to said first charging circuit;

the arrangement being such that when said portable information terminal is connected to said DC-input external cell charger, said secondary cell can be charged by a power supply supplied from said DC-input charging circuit via said second charging input terminal.

5. A cell charging system comprising:

a portable information terminal having a secondary cell housed therein;

a portable information terminal host for transmitting data to and from said portable information terminal, said portable information terminal being detachably connectable to said portable information terminal host;

said portable information terminal host having a charging power supply output terminal;

said portable information terminal having a charging circuit having a charging input terminal for charging the secondary cell;

the arrangement being such that when said portable information terminal is connected to said portable information terminal host, said secondary cell can be charged by a power supply supplied from said charging power supply output terminal via said charging input terminal and said charging circuit.

6. A cell charging system according to claim 5, wherein said charging circuit serves as a first charging circuit and said charging input terminal as a first charging input terminal, said cell charging system further comprising:

an external cell charger having a second charging circuit for being supplied with at least one of an AC power supply and a DC power supply;

said portable information terminal being detachably connectable to said external cell charger;

said portable information terminal having a second charging input terminal for charging the secondary cell in bypassing relationship to said first charging circuit;

the arrangement being such that when said portable information terminal is connected to said external cell charger, said secondary cell can be charged by a power supply supplied from said second charging circuit via said second charging input terminal.

7. An entertainment apparatus for reading and executing a program stored in a detachable storage medium, with a portable information terminal having a secondary cell housed therein and being detachably connectable to said entertainment apparatus, said entertainment apparatus having:

a charging power supply output terminal;

said portable information terminal having a charging circuit having a charging input terminal for charging the secondary cell;

the arrangement being such that when said portable information terminal is connected to said entertainment apparatus, said secondary cell can be charged by a power supply supplied from said charging power supply output terminal via said charging input terminal and said charging circuit.

8. A portable information terminal having a secondary cell, for executing a program supplied from an external source, comprising:

a first charging input terminal;

an internal charging circuit for charging the secondary cell with a first DC power supply supplied via said first charging input terminal; and a second charging input terminal for charging said secondary cell in bypassing relationship to said internal charging circuit, with a second DC power supply having a voltage higher than said first DC power supply.

9. A cell charger for a portable information terminal which executes a program supplied from an external source, comprising:

a secondary cell accommodated in said portable information terminal;

connections for a primary cell which can be housed in said cell charger;

connections for an external AC power supply; and a charging circuit connected to said connections, for selecting said primary cell or said external AC power supply and outputting a charging output to said secondary cell;

said charging circuit having means for generating said charging output using only said AC power supply when said external AC power supply is detected as being connected while said primary cell is being housed in said cell charger and said portable information terminal is attached to said cell charger.

10. An AC-input cell charger for charging a secondary cell of a portable information terminal which executes a program supplied from an external source, said AC-input cell charger comprising:

an AC-input charging circuit for being supplied with an AC power supply and outputting a DC power supply to charge said secondary cell of said portable information terminal;

said portable information terminal comprising:

an internal charging circuit;

a first charging terminal connected to said internal charging circuit for charging said secondary cell when said portable information terminal is connected to a device other than said AC-input cell charger through said first charging terminal; and a second charging terminal for charging said secondary cell in bypassing relationship to said internal charging circuit when said portable information terminal is connected to said AC-input cell charger through said second charging terminal.

11. An AC-input cell charger according to claim 10, wherein said first charging terminal and said second charging terminal are fixedly disposed at a spaced interval along a direction in which said portable information terminal is connected to said AC-input cell charger, said AC-input charging circuit having a charging power supply output terminal, said charging power supply output terminal being of such a length as to be electrically connected to only said second charging input terminal when said portable information terminal is connected to said AC-input cell charger.

12. A DC-input cell charger for charging a secondary cell of a portable information terminal which executes a program supplied from an external source, said DC-input cell charger comprising:

a DC-input charging circuit for being supplied with a DC power supply from a primary cell housed therein and outputting a DC power supply to charge said secondary cell of said portable information terminal;

said portable information terminal comprising:

an internal charging circuit;

a first charging terminal connected to said internal charging circuit for charging said secondary cell when said portable information terminal is connected to a device other than said DC-input cell charger through said first charging terminal; and a second charging terminal for charging said secondary cell in a bypassing relationship to said internal charging circuit when said portable information terminal is connected to said DC-input cell charger through said second charging terminal.

13. A DC-input cell charger according to claim 12, wherein said first charging terminal and said second charging terminal are fixedly disposed at a spaced interval along a direction in which said portable information terminal is connected to said DC-input cell charger, said DC-input charging circuit having a charging power supply output terminal, said charging power supply output terminal being of such a length as to be electrically connected to only said second charging input terminal when said portable information terminal is connected to said AC-input cell charger.

\* \* \* \* \*